(12) United States Patent
Wei et al.

US012149957B2

(10) Patent No.: US 12,149,957 B2
(45) Date of Patent: *Nov. 19, 2024

(54) INFRASTRUCTURE EQUIPMENT, COMMUNICATIONS DEVICES AND METHODS

(71) Applicant: Sony Group Corporation, Tokyo (JP)

(72) Inventors: Yuxin Wei, Basingstoke (GB); Samuel Asangbeng Atungsiri, Basingstoke (GB); Hideji Wakabayashi, Basingstoke (GB); Vivek Sharma, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/314,168

(22) Filed: May 9, 2023

(65) Prior Publication Data

US 2023/0276258 A1 Aug. 31, 2023

Related U.S. Application Data

(63) Continuation of application No. 17/266,613, filed as application No. PCT/EP2019/071264 on Aug. 7, 2019, now Pat. No. 11,683,699.

(30) Foreign Application Priority Data

Aug. 8, 2018 (EP) .................................... 18188079

(51) Int. Cl.
*H04W 4/00* (2018.01)
*H04B 7/185* (2006.01)
(Continued)

(52) U.S. Cl.
CPC .......... *H04W 16/28* (2013.01); *H04B 7/1851* (2013.01); *H04W 48/10* (2013.01)

(58) Field of Classification Search
CPC ..... H04W 16/28; H04W 48/10; H04W 84/06; H04W 48/12; H04B 7/1851; H04B 7/18526
See application file for complete search history.

(56) References Cited

U.S. PATENT DOCUMENTS 5,678,184 A 10/1997 Cutler, Jr. et al.
5,790,954 A 8/1998 Tayloe et al.
(Continued)

OTHER PUBLICATIONS

International Search Report and Written Opinion mailed on Oct. 31, 2019, received for PCT Application PCT/EP2019/071264, Filed on Aug. 7, 2019, 15 pages.
(Continued)

*Primary Examiner* — Stephen M D Agosta
(74) *Attorney, Agent, or Firm* — XSENSUS LLP (57) ABSTRACT

A method for operating an infrastructure equipment forming part of a wireless communications network is provided. The infrastructure equipment is a non-terrestrial network part of the wireless communications network configured to transmit one or more spot beams to provide a wireless access interface for transmitting signals to and receiving signals representing data from a communications device within a coverage region of a cell or one of the spot beams, the spot beam forming a cell. The method comprises broadcasting system information for receipt by the communications device, the system information including information relating to at least one of a cell or a spot beam of a neighbouring infrastructure equipment and a second spot beam of the infrastructure equipment, wherein the system information is broadcast in accordance with at least one predetermined condition.

16 Claims, 4 Drawing Sheets

(51) Int. Cl.
*H04W 16/28* (2009.01)
*H04W 48/10* (2009.01)

(56) References Cited

U.S. PATENT DOCUMENTS

| | | | |
|---|---|---|---|
| 5,862,478 A | 1/1999 | Cutler, Jr. et al. | |
| 6,108,538 A | 8/2000 | Blasiak et al. | |
| 6,246,874 B1 | 6/2001 | Voce | |
| 6,421,528 B1* | 7/2002 | Rosen | H04B 7/2041 455/13.3 |
| 6,609,002 B1 | 8/2003 | Krishnamurthy et al. | |
| 7,016,944 B1 | 3/2006 | Meyer et al. | |
| 7,191,461 B1* | 3/2007 | Arsenault | H04N 21/26283 348/E5.002 |
| 7,661,119 B1* | 2/2010 | Arsenault | H04N 7/20 725/50 |
| 9,888,426 B2 | 2/2018 | Ulupinar et al. | |
| 10,506,483 B1 | 12/2019 | Williamson et al. | |
| 11,483,065 B2 | 10/2022 | Atungsiri et al. | |
| 2004/0229616 A1 | 11/2004 | Dutta et al. | |
| 2006/0101340 A1 | 5/2006 | Sridhar et al. | |
| 2006/0221909 A1 | 10/2006 | Farineau et al. | |
| 2008/0046869 A1 | 2/2008 | Lambert et al. | |
| 2008/0076401 A1 | 3/2008 | Zeilingold et al. | |
| 2009/0061835 A1* | 3/2009 | Schmidt | H04W 4/185 455/414.2 |
| 2010/0194634 A1 | 8/2010 | Biacs et al. | |
| 2012/0020280 A1* | 1/2012 | Jansson | H04B 7/18582 370/316 |
| 2013/0121229 A1 | 5/2013 | Väre et al. | |
| 2013/0314276 A1 | 11/2013 | Zhang et al. | |
| 2014/0057555 A1* | 2/2014 | Ling | H04H 40/90 455/12.1 |
| 2014/0087718 A1 | 3/2014 | Yang et al. | |
| 2014/0206354 A1 | 7/2014 | Yasuoka | |
| 2014/0273949 A1 | 9/2014 | Duggan et al. | |
| 2015/0178061 A1 | 6/2015 | Wang et al. | |
| 2015/0327139 A1 | 11/2015 | Sirotkin et al. | |
| 2016/0323032 A1 | 11/2016 | Ulupinar et al. | |
| 2016/0323800 A1 | 11/2016 | Ulupinar et al. | |
| 2017/0032402 A1 | 2/2017 | Patsiokas et al. | |
| 2017/0180038 A1* | 6/2017 | Oza | H04B 7/18513 |
| 2017/0300453 A1 | 10/2017 | Shen et al. | |
| 2017/0302377 A1* | 10/2017 | Boroson | H04B 10/5161 |
| 2017/0339580 A1 | 11/2017 | Martin | |
| 2017/0353889 A1 | 12/2017 | Tatum | |
| 2018/0035354 A1 | 2/2018 | Martin | |
| 2018/0084476 A1 | 3/2018 | Kay et al. | |
| 2018/0097561 A1 | 4/2018 | Wharton et al. | |
| 2019/0021134 A1* | 1/2019 | Zhang | H04W 36/0033 |
| 2019/0044611 A1 | 2/2019 | Treesh | |
| 2019/0268782 A1* | 8/2019 | Martin | H04W 36/0094 |
| 2019/0380081 A1* | 12/2019 | Chang | H04W 36/0072 |
| 2019/0387440 A1* | 12/2019 | Yiu | H04W 36/165 |
| 2020/0068379 A1* | 2/2020 | Martin | H04W 8/00 |
| 2020/0068455 A1* | 2/2020 | Badic | H04W 36/0061 |
| 2021/0092781 A1 | 3/2021 | Lauridsen et al. | |
| 2021/0144612 A1 | 5/2021 | Wei et al. | |
| 2021/0281520 A1* | 9/2021 | Shrestha | H04W 56/0045 |
| 2022/0030532 A1* | 1/2022 | Hajir | H04B 7/18513 |
| 2022/0321206 A1 | 10/2022 | Shrestha et al. | |
| 2022/0330191 A1* | 10/2022 | Shin | G01S 19/256 |
| 2022/0369264 A1* | 11/2022 | Cheng | H04W 56/0055 |
| 2022/0399937 A1 | 12/2022 | Atungsiri et al. | |
| 2024/0137885 A1* | 4/2024 | Yuan | H04W 56/0045 |

OTHER PUBLICATIONS

Hughes, "NR-NTN: Paging in NGSO Satellite Systems", R1-1803507, 3GPP TSG RAN1 Meeting #92, Mar. 2, 2018, pp. 1-8.
Thales et al., "NR-NTN: Solution Principles for NR to Support Non-Terrestrial Networks", R1-1807864, 3GPP TSG RAN1 Meeting #93, May 21-25, 2018, 12 pages.
Sony, "Discussions on Handover in NTN", R1-1807243, 3GPP TSG RAN1 Meeting #93, May 21-25, 2018, 5 pages.
3GPP, "Radio Resource Control (RRC)", Release 15, TS 25.331 V15.3.0, Jun. 2018, pp. 1-2318.
Holma et al., "LTE for UMTS OFDMA and SC-FDMA Based Radio Access", John Wiley and Sons, 2009, pp. 25-27.
NTT Docomo, Inc., "Revised WID on New Radio Access Technology", RP-172834, Dec. 18-21, 2017, 11 pages.
3GPP, "Study on Scenarios and Requirements for Next Generation Access Technologies", Release 14, TR 38.913 V14.2.0, Mar. 2017, pp. 1-38.
TS 36.311, "Evolved Universal Terrestrial Radio Access (E-UTRA); Radio Resource Control (RRC); Protocol specification", 3rd Generation Partnership Project, Jun. 2018, 791 pages.
Study on New Radio (NR) to Support Non Terrestrial Networks, Dec. 2017, TR 38.811. 56 pages.

* cited by examiner

INFRASTRUCTURE EQUIPMENT, COMMUNICATIONS DEVICES AND METHODS

CROSS-REFERENCE TO RELATED APPLICATIONS

The present application is a continuation of U.S. application Ser. No. 17/266,613, filed Feb. 8, 2021, which is based on PCT filing PCT/EP2019/071264, filed Aug. 7, 2019, which claims priority to EP 18188079.0, filed Aug. 8, 2018, the entire contents of each are incorporated herein by reference.

BACKGROUND

Field of Disclosure

The present disclosure relates generally to communications devices, infrastructure equipment and methods of operating communications devices and infrastructure equipment and specifically to methods of transmitting signalling information from infrastructure equipment of non-terrestrial networks to communications devices.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes so-called "non-terrestrial networks", or NTN for short. 3GPP has proposed in Release 15 of the 3GPP specifications to develop technologies for providing coverage by means of one or more antennas mounted on an airborne or space-borne vehicle [1].

Non-terrestrial networks may provide service in areas that cannot be covered by terrestrial cellular networks (i.e. those where coverage is provided by means of land-based antennas), such as isolated or remote areas, on board aircraft or vessels) or may provide enhanced service in other areas. The expanded coverage that may be achieved by means of non-terrestrial networks may provide service continuity for machine-to-machine (M2M) or Internet of things' (IoT) devices, or for passengers on board moving platforms (e.g. passenger vehicles such as aircraft, ships, high speed trains, or buses). Other benefits may arise from the use of non-terrestrial networks for providing multicast/broadcast resources for data delivery.

The use of different types of network infrastructure equipment and requirements for coverage enhancement give rise to new challenges for efficiently handling communications in wireless communications systems that need to be addressed.

SUMMARY OF THE DISCLOSURE

The present disclosure can help address or mitigate at least some of the issues discussed above.

Embodiments of the present technique can provide a method for operating an infrastructure equipment forming part of a wireless communications network. The infrastructure equipment is a non-terrestrial network part of the wireless communications network configured to transmit one or more spot beams to provide a wireless access interface for transmitting signals to and receiving signals representing data from a communications device within a coverage region of a cell one of the spot beams, the spot beam forming a cell. The method comprises broadcasting system information for receipt by the communications device, the system information including information relating to at least one of a cell or a spot beam of a neighbouring infrastructure equipment and a second spot beam of the infrastructure equipment, wherein the system information is broadcast in accordance with at least one predetermined condition.

Embodiments of the present technique, which further relate to communications devices, methods of operating communications devices and infrastructure equipment and circuitry for communications devices and infrastructure equipment, allow for the transmission of system information by non-terrestrial infrastructure equipment to communications devices in ways in which the communication device's efforts to re-acquire system information after re-selection or handover to a new NTN cell may be minimised. This allows for the control signalling overhead to be reduced, which is particularly important in NTNs where propagation delay between the infrastructure equipment and communications device may be of the order of hundreds of milliseconds.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
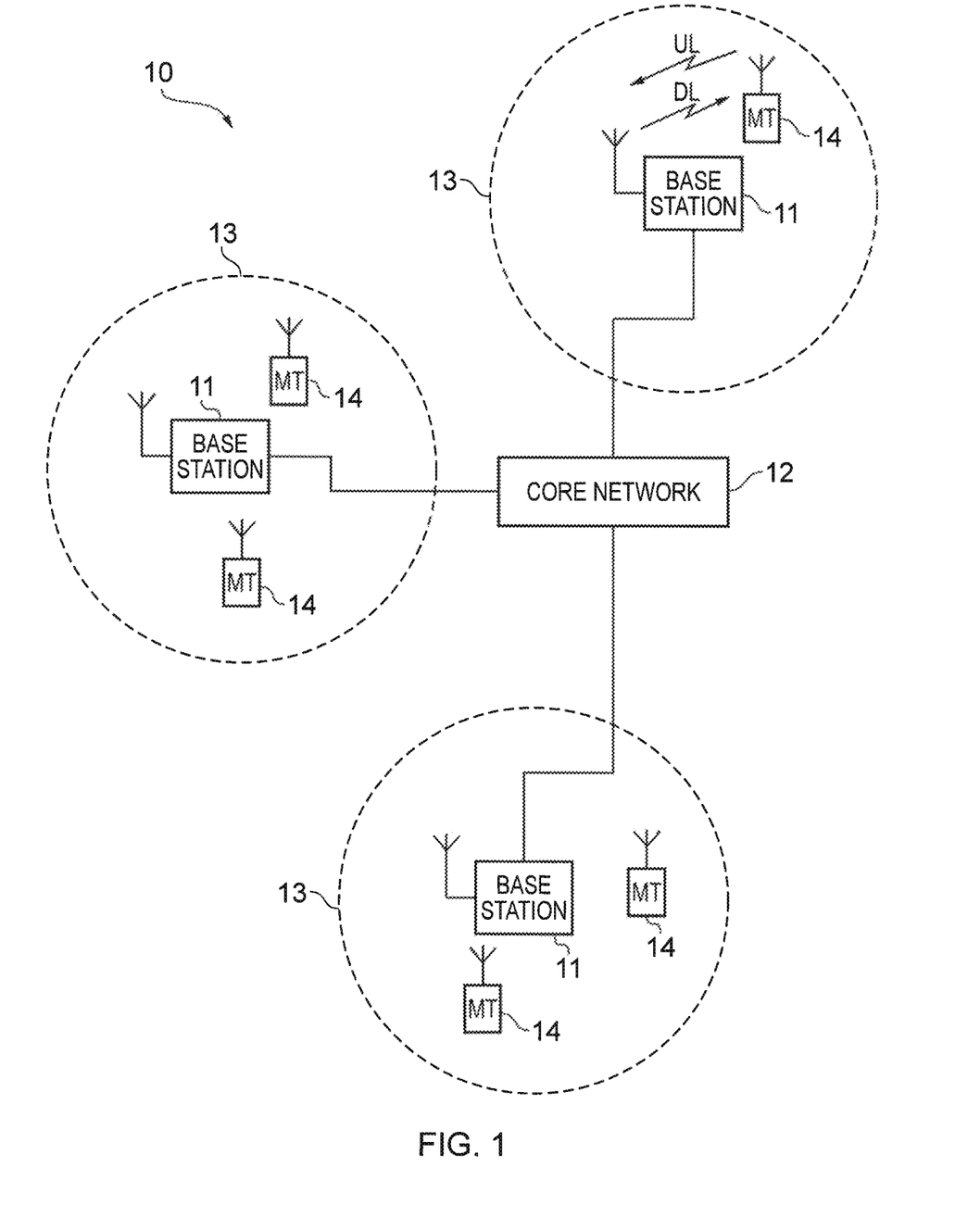
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink (DL). Data is transmitted from terminal devices 14 to the base stations 11 via a radio uplink (UL). The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present disclosure can also find application with advanced wireless communications systems such as those referred to as 5G or New Radio (NR) Access Technology. The use cases that are considered for NR include:

Enhanced Mobile Broadband (eMBB)
Massive Machine Type Communications (mMTC)
Ultra Reliable & Low Latency Communications (URLLC) [3]

eMBB services are characterised by high capacity with a requirement to support up to 20 Gb/s. The requirement for URLLC is a reliability of $1-10^{-5}$ (99.999%) for one transmission of a relatively short packet, for example a 32 byte packet with a user plane latency of 1 ms [4].

The elements of the wireless access network shown in FIG. 1 may be equally applied to a 5G new RAT configuration, except that a change in terminology may be applied as mentioned above.

Figure 2:
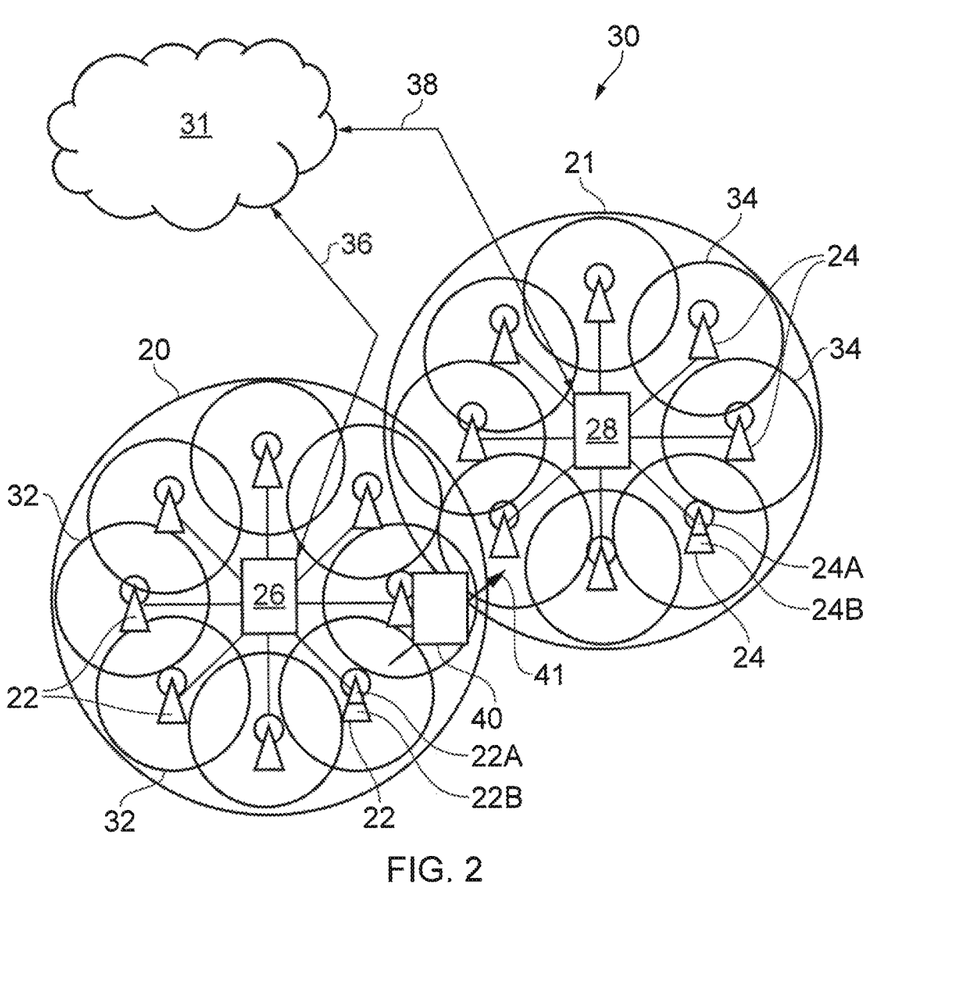
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit) 26, 28 in communication with a core network component 31 over a respective wired or wireless link 36, 38. The respective controlling nodes 26, 28 are also each in communication with a plurality of distributed units (radio access nodes/remote transmission and reception points (TRPs)) 22, 24 in their respective cells. Again, these communications may be over respective wired or wireless links. The distributed units 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22a, 24a for transmission and reception of wireless signals and processor circuitry 22b, 24b configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 40 is represented in FIG. 2 within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating, or even if any distributed units 22 are connected to the controlling node 26 and involved in the routing of communications at all. In such cases, as far as the terminal device is concerned, it simply transmits uplink data to the controlling node 26 and receives downlink data from the controlling node 26 and the terminal device has no awareness of the involvement of the distributed units 22, though may be aware of radio configurations transmitted by distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2.

It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

Non-Terrestrial Networks (NTNs)

Figure 3:
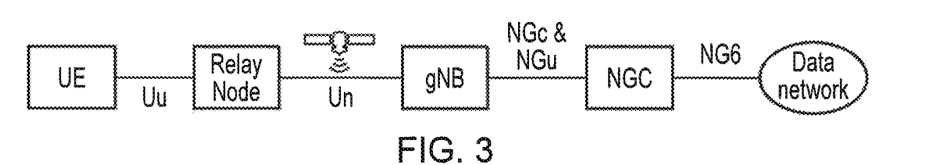
FIG. 3 is reproduced from [1], and illustrates a first example of an NTN featuring an access networking service relay node and based on a satellite/aerial with a bent pipe payload.
Figure 4:
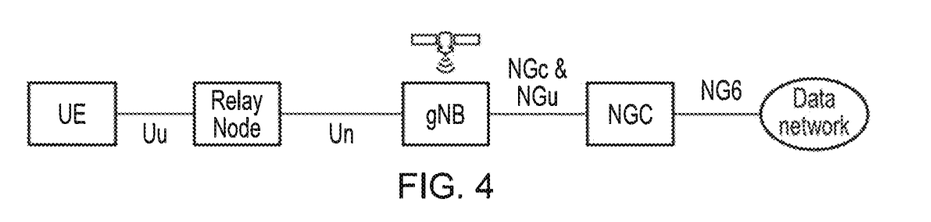
FIG. 4 is reproduced from [1], and illustrates a second example of an NTN featuring an access networking service relay node and based on a satellite/aerial coupled with a gNodeB.

An overview of NR-NTN can be found in [1], and much of the following wording, along with FIGS. 3 and 4, has been reproduced from that document as a way of background.

As a result of the wide service coverage capabilities and reduced vulnerability of space/airborne vehicles to physical attacks and natural disasters, Non-Terrestrial Networks are expected to:

foster the roll out of 5G service in un-served areas that cannot be covered by terrestrial 5G network (isolated/remote areas, on board aircrafts or vessels) and under-served areas (e.g. sub-urban/rural areas) to upgrade the performance of limited terrestrial networks in cost effective manner, reinforce the 5G service reliability by providing service continuity for M2M/IoT devices or for passengers on board moving platforms (e.g. passenger vehicles-aircraft, ships, high speed trains, bus) or ensuring service availability anywhere especially for critical communications, future railway/maritime/aeronautical communications, and to enable 5G network scalability by providing efficient multicast/broadcast resources for data delivery towards the network edges or even user terminal.

The benefits relate to either Non-Terrestrial networks operating alone or to integrated terrestrial and Non-Terrestrial networks. They will impact at least coverage, user bandwidth, system capacity, service reliability or service availability, energy consumption and connection density. A role for Non-Terrestrial Network components in the 5G system is expected for at least the following verticals: transport, Public Safety, Media and Entertainment, eHealth, Energy, Agriculture, Finance and Automotive.

FIG. 3 illustrates a first example of an NTN featuring an access networking service relay nodes and based on a satellite/aerial with a bent pipe payload. In this example NTN, the satellite or the aerial will relay a "satellite friendly" NR signal between the gNodeB and the relay nodes in a transparent manner.

FIG. 4 illustrates a second example of an NTN featuring an access networking service relay nodes and based on a satellite/aerial coupled with a gNodeB. In this example NTN, the satellite or aerial embarks full or part of a gNodeB to generate or receive a "satellite friendly" NR signal to/form the relay nodes. This requires sufficient on-board processing capabilities to be able to include a gNodeB or relay node functionality.

Relay node (RN) related use cases such as those shown in FIGS. 3 and 4 will play an important role in the commercial deployment of NTN; i.e. relay nodes mounted on high speed trains, relay nodes mounted in cruise ships, relay nodes at home/office and relay nodes mounted on airliners. It should be well understood by those skilled in the art that the proposed solutions of embodiments of the present technique could be equally applied to conventional UEs and RNs.

Figure 5:
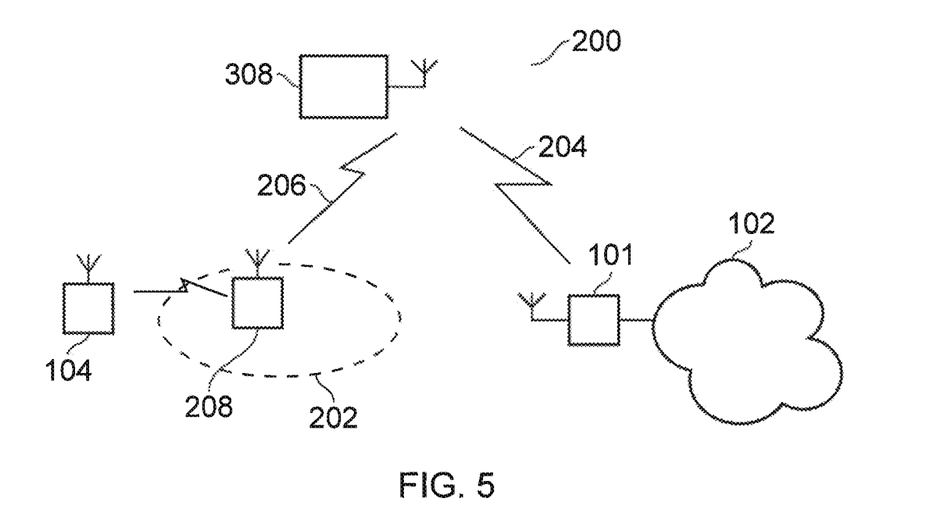
FIG. 5 schematically shows an example of a wireless communications system which may be configured to operate in accordance with embodiments of the present disclosure.

FIG. 5 schematically shows an example of a wireless communications system 200 which may be configured to operate in accordance with embodiments of the present disclosure. The wireless communications system 200 in this example is based broadly around an LTE-type or 5G-type architecture. Many aspects of the operation of the wireless communications system/network 200 are known and understood and are not described here in detail in the interest of brevity. Operational aspects of the wireless communications system 200 which are not specifically described herein may be implemented in accordance with any known techniques, for example according to the current LTE-standards or the proposed 5G standards.

The wireless communications system 200 comprises a core network part 102 (which may be a 5G core network or a NG core network) coupled to a radio network part. The radio network part comprises a base station (g-node B) 101 coupled to a non-terrestrial network part 308. The non-terrestrial network part 308 may be an example of infrastructure equipment. Alternatively, or in addition, the non-terrestrial network part 308 may be mounted on a satellite vehicle or on an airborne vehicle.

The non-terrestrial network part 308 is further coupled to a communications device 208, located within a cell 202, by means of a wireless access interface provided by a wireless communications link 206. For example, the cell 202 may correspond to the coverage area of a spot beam generated by the non-terrestrial network part 308. The boundary of the cell 202 may depend on an altitude of the non-terrestrial network part 308 and a configuration of one or more antennas of the non-terrestrial network part 308 by which the non-terrestrial network part 308 transmits and receives signals on the wireless access interface.

The non-terrestrial network part 308 may be a satellite in an orbit with respect to the Earth, or may be mounted on such a satellite. For example, the satellite may be in a geo-stationary earth orbit (GEO) such that the non-terrestrial network part 308 does not move with respect to a fixed point on the Earth's surface. The geo-stationary earth orbit may be approximately 36,786 km above the Earth's equator. Alternatively, the satellite may be in a non-geostationary orbit (NGSO), so that the non-terrestrial network part 308 moves with respect to a fixed point on the Earth's surface. The non-terrestrial network part 308 may be an airborne vehicle such as an aircraft, or may be mounted on such a vehicle. The airborne vehicle (and hence the non-terrestrial network part 308) may be stationary with respect to the surface of the Earth or may move with respect to the surface of the Earth.

In FIG. 5, the base station 101 is shown as ground-based, and coupled to the non-terrestrial network part 308 by means of a wireless communications link 204. The non-terrestrial network part 308 receives signals representing downlink data transmitted by the base station 101 on the wireless communications link 204 and, based on the received signals, transmits signals representing the downlink data via the wireless communications link 206 providing the wireless access interface for the communications device 206. Similarly, the non-terrestrial network part 308 receives signals representing uplink data transmitted by the communications device 206 via the wireless access interface comprising the wireless communications link 206 and transmits signals representing the uplink data to the base station 101 on the wireless communications link 204. The wireless communications links 204, 206 may operate at a same frequency, or may operate at different frequencies.

The extent to which the non-terrestrial network part 308 processes the received signals may depend upon a processing capability of the non-terrestrial network part 308. For example, the non-terrestrial network part 308 may receive signals representing the downlink data on the wireless communication link 204, amplify them and (if needed) re-modulate onto an appropriate carrier frequency for onwards transmission on the wireless access interface provided by the wireless communications link 206. Alternatively, the non-terrestrial network part 308 may be configured to decode the signals representing the downlink data received on the wireless communication link 204 into un-encoded downlink data, re-encode the downlink data and modulate the encoded downlink data onto the appropriate carrier frequency for onwards transmission on the wireless access interface provided by the wireless communications link 206.

The non-terrestrial network part 308 may be configured to perform some of the functionality conventionally carried out by the base station 101. In particular, latency-sensitive functionality (such as acknowledging a receipt of the uplink data, or responding to a RACH request) may be performed by the non-terrestrial network part 308 instead of by the base station 101.

The base station 101 may be co-located with the non-terrestrial network part 308; for example, both may be mounted on the same satellite vehicle or airborne vehicle, and there may be a physical (e.g. wired, or fibre optic)

connection on board the satellite vehicle or airborne vehicle, providing the coupling between the base station 101 and the non-terrestrial network part 308. In such co-located arrangements, a wireless communications link between the base station 101 and a ground station (not shown) may provide connectivity between the base station 101 and the core network part 102.

The communications device 208 shown in FIG. 5 may be configured to act as a relay node. That is, it may provide connectivity to one or more terminal devices such as the terminal device 104. When acting as a relay node, the communications device 208 transmits and receives data to and from the terminal device 104, and relays it, via the non-terrestrial network part 308 to the base station 101. The communications device 208, acting as a relay node, may thus provide connectivity to the core network part 102 for terminal devices which are within a transmission range of the communications device 208.

It will be apparent to those skilled in the art that many scenarios can be envisaged in which the combination of the communications device 208 and the non-terrestrial network part 308 can provide enhanced service to end users. For example, the communications device 208 may be mounted on a passenger vehicle such as a bus or train which travels through rural areas where coverage by terrestrial base stations may be limited. Terminal devices on the vehicle may obtain service via the communications device 208 acting as a relay, which is coupled to the non-terrestrial network part 308.

There is a need to ensure that connectivity for the communications device 208 with the base station 101 can be maintained, in light of the movement of the communications device 208, the movement of the non-terrestrial network part 308 (relative to the Earth's surface), or both. According to conventional cellular communications techniques, a decision to change a serving cell of the communications device 208 may be based on measurements of one or more characteristics of a radio frequency communications channel, such as signal strength measurements or signal quality measurements. In a terrestrial communications network, such measurements may effectively provide an indication that the communications device 208 is at, or approaching, an edge of a coverage region of a cell, since, for example, path loss may broadly correlate to a distance from a base station. However, such conventional measurement-based algorithms may be unsuitable for cells generated by means of the transmission of beams from a non-terrestrial network part, such as the cell 202 generated by the non-terrestrial network part 308. In particular, path loss may be primarily dependent on an altitude of the non-terrestrial network part 308 and may vary only to a very limited extent (if at all) at the surface of the Earth, within the coverage region of the cell 202.

A further disadvantage of conventional techniques may be the relatively high rate at which cell changes occur for the communications device 208 obtaining service from one or more non-terrestrial network parts. For example, where the non-terrestrial network part 308 is mounted on a satellite in a low-earth orbit (LEO), the non-terrestrial network part 308 may complete an orbit of the Earth in around 90 minutes; the coverage of a cell generated by the non-terrestrial network part 308 will move very rapidly, with respect to a fixed observation point on the surface of the earth. Similarly, it may be expected that the communications device 208 may be mounted on an airborne vehicle itself, having a ground speed of several hundreds of kilometres per hour.

In NTNs, implementations and techniques should be targeted which reduce the control signalling overhead, such as during handover and when the UE is attempting to acquire system information (SI) following re-selection or handover, as the propagation delay between ground-based devices and satellites will be very large, e.g. to the degree of hundreds of milliseconds. This may become a particular issue if a UE has to receive SI multiple times in one day even though the system information may not change.

System Information Enhancement for NTN

Figure 6:
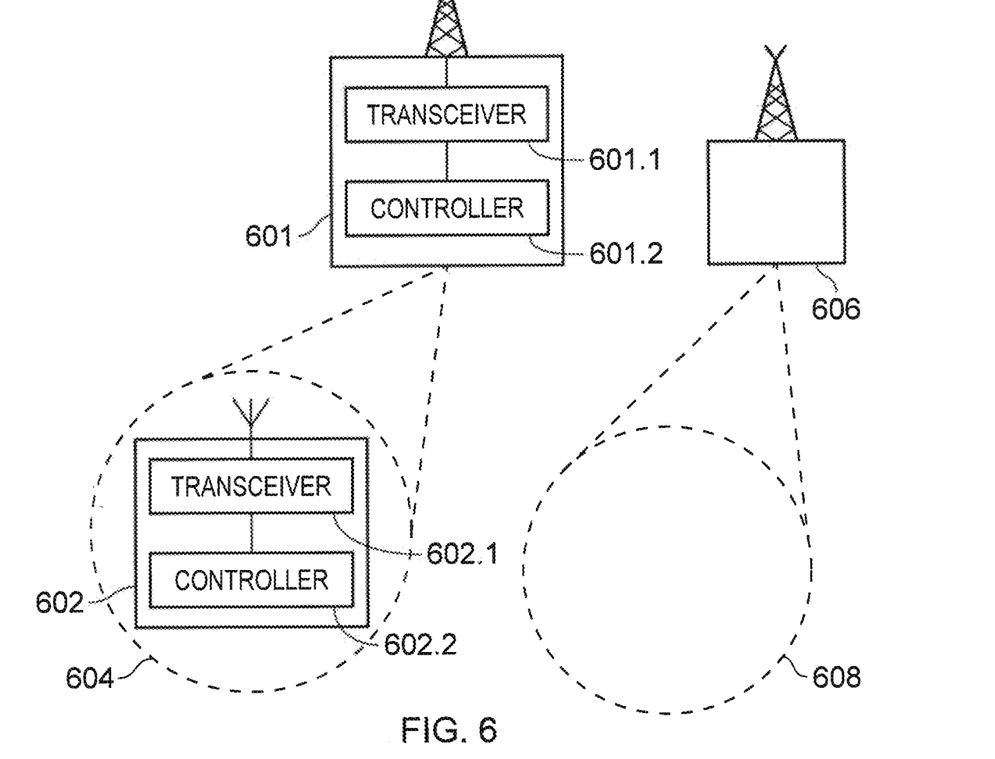
FIG. 6 shows schematic representation of a wireless communications network comprising an infrastructure equipment and a plurality of communications devices in accordance with embodiments of the present technique.

Such a reduction in the control signalling overheads of NTNs may be provided by embodiments of the present technique. FIG. 6 shows schematic representation of a wireless communications network comprising an infrastructure equipment 601 and a communications device 602 in accordance with embodiments of the present technique. The infrastructure equipment 601 is a non-terrestrial network part configured to transmit one or more spot beams to provide a wireless access interface for transmitting signals to and receiving signals representing data from the communications device 602 within a coverage region of a cell 604 or one of the spot beams, the spot beam forming a cell 604.

The infrastructure equipment 601 and the communications device 602 each comprises a transceiver (or transceiver circuitry) 601.1, 602.1, and a controller (or controller circuitry) 601.2, 602.2. Each of the controllers 601.2, 602.2 may be, for example, a microprocessor, a CPU, or a dedicated chipset, etc.

The transceiver circuitry 601.1 and the controller circuitry 601.2 of the infrastructure equipment 601 are configured in combination to broadcast system information for receipt by the communications device 602, the system information including information relating to a neighbouring cell or spot beam 608 of a neighbouring infrastructure equipment 606, wherein the system information is broadcast in accordance with at least one predetermined condition. A relative movement between the communications device 602 and the infrastructure equipment 601 and/or neighbouring infrastructure equipment 606 (where one or all may be moving) may result in the communications device 602 moving from the coverage region of the cell or the spot beam 604 of the infrastructure equipment 601 to a coverage region of the cell or the spot beam 608 of the neighbouring infrastructure equipment 606. In some arrangements of embodiments of the present technique, the spot beams 604 and 608 may be provided by the same non-terrestrial network part (e.g. infrastructure equipment 601).

In conventional handover procedures in LTE networks, within the handover command, the target node provides a subset of the parameters included in MIB (master information block), SIB1 (system information block 1), SIB2—i.e. the most essential ones (mainly relating to RACH and physical configuration, see in [5] for example radioResourceConfigCommon within MobilityControlInfo).

In order to reduce the handover signalling, the serving satellite or spot beam can include some common radio resource configuration information of its neighbour satellites or spot beam in system information, such as RACH-config-Common, BCCH-config, PCCH-config, CellAccessRelatedInfo etc. instead of including them in the dedicated handover signalling transmitted to the UE.

Any dedicated resources (if any), such as pre-allocated preambles in RACH configuration for a specific UE during handover execution, should still be included in RRC reconfiguration message.

In arrangements of embodiments of the present technique, the NTN specific SIBs could be very important in addition to the access information discussed above. For example, it is assumed that UE positioning information is very important for NTN networks, so all the related positioning assistance information should be provided in system information. In other words, the at least one predetermined condition comprises the broadcasted system information including system information which relates to at least one of accessing of the cell or the spot beam of the neighbouring infrastructure equipment by the communications device and non-terrestrial network aspects of the neighbouring infrastructure equipment.

Among this NTN specific system information, ephemeris information is very important and each satellite should have its own configuration. Ephemeris information relates to the position of the satellite in the sky at any given time. In other words, the non-terrestrial network aspects of the neighbouring infrastructure equipment comprises ephemeris information of the neighbouring infrastructure equipment. This ephemeris information may be ephemeris information of a Global Navigation Satellite System (GNSS) satellite, or of a LEO satellite.

Depending on the positioning schemes employed, the assistance information could be different, an example of the GNSS related assistance information could be any of:
  assistance data,
  reference time,
  reference location,
  ionospheric models,
  earth orientation parameters,
  GNSS-GNSS time offsets,
  differential GNSS corrections,
  ephemeris and clock models,
  real-time integrity,
  data bit assistance,
  acquisition assistance,
  almanac, or
  UTC models.

If such an NTN specific SIB is not included in the SI, then it is envisaged that it should instead be included in the handover signalling during the handover from one infrastructure equipment to a neighbouring infrastructure equipment.

It should further be noted that, depending on whether a spot beam forms a cell or not, the broadcasting of neighbouring cell SIBs will be applicable to spot beams as well if a spot beam does form a cell.

In NR, in order to reduce the system information re-acquisition overhead, a UE could check an area specific identifier, such as system InformationAreaID, in SIB1 after it re-selects/hands over to a new cell. If the area ID matches that of its previously accessed cell and the stored SIB is an area applicable SIB while still valid and value tag remains same, the UE does not need to receive the stored system information from the new cell.

In arrangements of embodiments of the present technique, in NTN, in order to reduce the UE's effort to read system information, the area specific related SI of neighbouring cells can be included in the serving cell's broadcasted SI, for example in system InformationAreaID, systemInfoAreaScope, etc. In other words, the at least one predetermined condition comprises the broadcasted system information being transmitted in combination with an identifier of a system information area in which the system information is applicable. This system information area may be a geographical area, or it may be a logical area. With this information, the UE will know in advance whether it needs to re-acquire/send an on-demand SI request for certain SIBs after cell re-selection/handover. In other words, the identifier of the system information area in which the system information is applicable indicates to the communications device whether or not the communications device should ignore the system information, or instead should re-acquire the system information.

As an optimisation, if the AreaID of the serving cell and neighbouring cell is different, the serving cell can further include the schedulingInfo (area specific information is included in the schedulingInfo) of that neighbouring cell. The UE can utilise such information to read related SI or send a SI request directly after re-selecting/handing over to that neighbouring cell.

In another arrangement of embodiments of the present technique, this area applicable SI related information can be included in the handover signalling transmitted to the UE. In other words, if the cell or the spot beam of the infrastructure equipment and the cell or the spot beam of the neighbouring infrastructure equipment are associated with different system information areas, the system information and the identifier of the system information area in which the system information is applicable are transmitted to the communications device as part of a handover command instructing the communications device to change between the coverage region of the cell or the spot beam of the infrastructure equipment and a coverage region of the cell or the spot beam of the neighbouring infrastructure equipment.

In arrangements of embodiments of the present technique, a separate SI validity timer may be specified for the NTN UEs. With LEO satellite systems, a UE may have to change between cells/spot beams very quickly. If the buffer capacity at the UE allows it, it would be beneficial to store as much SI as possible in order to ease the UE's efforts in the frequent re-acquisition of the system information, because of such frequent involuntary cell change. In other words, the at least one predetermined condition comprises the broadcasted system information being transmitted in combination with one or more validity timers, each of the one or more validity timers being associated with a portion of the system information and indicating a time duration for which the associated portion of the system information is valid. When the validity timer indicates that a portion of system information is valid, it indicates that the communications device should not attempt to re-acquire that portion of system information. Here, the portions of system information may be SIBs, and each SIB may have its own validity timer. If one of the portions of system information changes, the validity timer associated with that portion of system information may be reset.

In NR, on-demand SI is introduced. System Information is divided into Minimum SI and Other SI. Minimum SI is periodically broadcast, and comprises basic information required for initial access and information for acquiring any other SI, where the other SI is either broadcast periodically or provisioned on-demand, i.e. scheduling information. The Other SI encompasses everything not broadcast in the Minimum SI, and as mentioned above may either be broadcast, or provisioned in a dedicated manner, either triggered by the network or upon request from the UE. In other words, the at least one predetermined condition comprises the broadcasted system information being periodically broadcast and being system information relating to at least one of accessing of the cell or the spot beam of the neighbouring infrastructure equipment by the communications device and acquiring other system information, wherein the other system information is either broadcast or transmitted to the communications device on-demand.

In arrangements of embodiments of the present technique, for NTN, as the required acquisition time of on-demand system information may be too long because of the propagation delay to the UE, it is better to disable the UE's function to request an on-demand SI. This can be implemented by adding a new IE in schedulingInfo, or by re-using the si-broadacstStatus IE to set all the bits as broadcast. In other words, the infrastructure equipment is configured to control whether or not the communications device is permitted to request on-demand the other system information. When the UE is permitted to request on-demand system information, it may do so by transmitting such a request to the network. Assuming the network accepts this request, it responds to the UE as such, and the UE then receives the system information from the network.

In another arrangement of embodiments of the present technique, the trade-off between broadcast signalling cost and propagation delay on the UE's on demand SI request is taken into consideration. When the UE's movement is such that its coverage is provided by satellites within the same orbital plane, the serving cell will include the neighbouring cell's satellite specific SIB in its SI from satellites within that orbital plane. However, if the UE moves such that its coverage can now be provided by a satellite in another orbital plane, the on-demand SI request can be enabled, and after the UE moves to the new plane, it can send an on-demand SI request for the new SI configuration. In other words, the controlling whether or not the communications device is permitted to request on-demand the other system information is performed by the infrastructure equipment dependent on a relative location of the communications device to at least one of the infrastructure equipment and the neighbouring infrastructure equipment.

In another arrangement of embodiments of the present technique, hierarchical cell coverage is applied. The wider spot coverage overlays multiple small spot cells. On-demand SI is handled by the wider spot coverage, so as to keep enough time to request SI by UEs and to receive the SIs at the UEs from the infrastructure equipment. Wider spot coverage may use different frequencies to avoid interference, or may use non-orthogonal modulation methods to accept the interference. In this described arrangement, the neighbouring infrastructure equipment means using a different frequency or non-orthogonal system in the same physical infrastructure equipment (i.e. infrastructure equipment 601 is physically both of infrastructure equipment 601 and neighbouring infrastructure equipment 606).

In some arrangements of embodiments of the present technique, the coverage region of the cell varies over time in accordance with a motion of the non-terrestrial network part with respect to the surface of the Earth. Alternatively, in some arrangements of embodiments of the present technique, a trajectory of the non-terrestrial network part is such that the coverage region of the cell or the spot beam is substantially constant over a time period.

Flow Chart Representation

Figure 7:
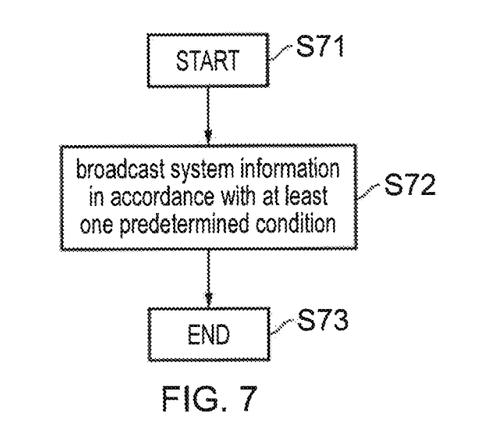
FIG. 7 is a flow diagram representation of a method of operating an infrastructure equipment according to embodiments of the present technique.

FIG. 7 shows a flow diagram illustrating a method of operating an infrastructure equipment forming part of a wireless communications network according to embodiments of the present technique. The infrastructure equipment is a non-terrestrial network part of the wireless communications network configured to transmit one or more spot beams to provide a wireless access interface for transmitting signals to and receiving signals representing data from a communications device within a coverage region of a cell or one of the spot beams, the spot beam forming a cell.

In some arrangements of embodiments of the present technique, the non-terrestrial network part may comprise a satellite, an airborne vehicle or an airborne platform. The airborne platform may for example be a High Altitude Pseudo Satellite (HAPS), also termed High Altitude Platform Station, which are positioned typically in the stratosphere at an altitude of above 20 km. An example of a HAPS may be a station tethered to an aircraft or a balloon. In some arrangements of embodiments of the present technique, the communications device is a user equipment. Alternatively, the communications device may act as a relay node for one or more user equipment, each of the one or more user equipment being in one of an RRC connected mode, an RRC idle state or an RRC inactive state.

The method begins in step S71. The method comprises, in step S72, broadcasting system information for receipt by the communications device, the system information including information relating to at least one of a cell or a spot beam of a neighbouring infrastructure equipment and a second spot beam of the infrastructure equipment. The system information is broadcast in step S72 in accordance with at least one predetermined condition The process ends in step S73.

Those skilled in the art would appreciate that the method shown by FIG. 7 may be adapted in accordance with embodiments of the present technique. For example, other intermediate steps may be included in the method, or the steps may be performed in any logical order.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A method for operating an infrastructure equipment forming part of a wireless communications network, the infrastructure equipment being a non-terrestrial network part of the wireless communications network configured to transmit one or more spot beams to provide a wireless access interface for transmitting signals to and receiving signals representing data from a communications device within a coverage region of a cell or one of the spot beams, the spot beam forming a cell, the method comprising broadcasting system information for receipt by the communications device, the system information including information relating to at least one of a cell or a spot beam of a neighbouring infrastructure equipment and a second spot beam of the infrastructure equipment, wherein the system information is broadcast in accordance with at least one predetermined condition.

Paragraph 2. A method according to Paragraph 1, wherein the at least one predetermined condition comprises the broadcasted system information including system information which relates to at least one of accessing of the cell or the spot beam of the neighbouring infrastructure equipment by the communications device and non-terrestrial network aspects of the neighbouring infrastructure equipment.

Paragraph 3. A method according to Paragraph 2, wherein the non-terrestrial network aspects of the neighbouring infrastructure equipment comprises ephemeris information of the neighbouring infrastructure equipment.

Paragraph 4. A method according to any of Paragraphs 1 to 3, wherein the at least one predetermined condition comprises the broadcasted system information being transmitted in combination with an identifier of a system information area in which the system information is applicable.

Paragraph 5. A method according to Paragraph 4, wherein the identifier of the system information area in which the system information is applicable indicates to the communications device whether or not the communications device should ignore the system information.

Paragraph 6. A method according to Paragraph 4 or Paragraph 5, wherein, if the cell or the spot beam of the infrastructure equipment and the cell or the spot beam of the neighbouring infrastructure equipment are associated with different system information areas, the system information and the identifier of the system information area in which the system information is applicable are transmitted to the communications device as part of a handover command instructing the communications device to change between the coverage region of the cell or the spot beam of the infrastructure equipment and a coverage region of the cell or the spot beam of the neighbouring infrastructure equipment Paragraph 7. A method according to any of Paragraphs 1 to 6, wherein the at least one predetermined condition comprises the broadcasted system information being transmitted in combination with one or more validity timers, each of the one or more validity timers being associated with a portion of the system information and indicating a time duration for which the associated portion of the system information is valid.

Paragraph 8. A method according to Paragraph 7, wherein when the validity timer indicates that a portion of system information is valid, it indicates that the communications device should not attempt to re-acquire that portion of system information.

Paragraph 9. A method according to Paragraph 7 or Paragraph 8, wherein if one of the portions of system information changes, the method comprises resetting the validity timer associated with that portion of system information.

Paragraph 10. A method according to any of Paragraphs 1 to 9, wherein the at least one predetermined condition comprises the broadcasted system information being periodically broadcast and being system information relating to at least one of accessing of the cell or the spot beam of the neighbouring infrastructure equipment by the communications device and acquiring other system information, wherein the other system information is either broadcast or transmitted to the communications device on-demand.

Paragraph 11. A method according to Paragraph 10, wherein the infrastructure equipment is configured to control whether or not the communications device is permitted to request on-demand the other system information.

Paragraph 12. A method according to Paragraph 10 or Paragraph 11, wherein the controlling whether or not the communications device is permitted to request on-demand the other system information is performed by the infrastructure equipment dependent on a relative location of the communications device to at least one of the infrastructure equipment and the neighbouring infrastructure equipment.

Paragraph 13. A method according to any of Paragraphs 1 to 12, wherein the coverage region of the cell varies over time in accordance with a motion of the non-terrestrial network part with respect to the surface of the Earth.

Paragraph 14. A method according to any of Paragraphs 1 to 13, wherein
a trajectory of the non-terrestrial network part is such that the coverage region of the cell or the spot beam is substantially constant over a time period.

Paragraph 15. A method according to any of Paragraphs 1 to 14, wherein the non-terrestrial network part comprises a satellite, an airborne vehicle or an airborne platform.

Paragraph 16. A method according to any of Paragraphs 1 to 15, wherein the communications device is a user equipment.

Paragraph 17. A method according to any of Paragraphs 1 to 16, wherein the communications device is acting as a relay node for one or more user equipment, each of the one or more user equipment being in one of an RRC connected mode, an RRC idle state or an RRC inactive state.

Paragraph 18. An infrastructure equipment forming part of a wireless communications network, the infrastructure equipment being a non-terrestrial network part of the wireless communications network configured to transmit one or more spot beams to provide a wireless access interface for transmitting signals to and receiving signals representing data from a communications device within a coverage region of a cell or one of the spot beams, the spot beam forming a cell, the infrastructure equipment comprising transceiver circuitry and controller circuitry configured in combination
to broadcast system information for receipt by the communications device, the system information including information relating to at least one of a cell or a spot beam of a neighbouring infrastructure equipment and a second spot beam of the infrastructure equipment,
wherein the system information is broadcast in accordance with at least one predetermined condition.

Paragraph 19. Circuitry for an infrastructure equipment forming part of a wireless communications network, the infrastructure equipment being a non-terrestrial network part of the wireless communications network configured to transmit one or more spot beams to provide a wireless access interface for transmitting signals to and receiving signals representing data from a communications device within a coverage region of a cell or one of the spot beams, the spot beam forming a cell, the infrastructure equipment comprising transceiver circuitry and controller circuitry configured in combination
to broadcast system information for receipt by the communications device, the system information including information relating to at least one of a cell or a spot beam of a neighbouring infrastructure equipment and a second spot beam of the infrastructure equipment,
wherein the system information is broadcast in accordance with at least one predetermined condition.

Paragraph 20. A method for operating a communications device in a wireless communications network, the wireless communications network comprising an infrastructure equipment, the infrastructure equipment being a non-terrestrial network part of the wireless communications network configured to transmit one or more spot beams to provide a wireless access interface for transmitting signals to and receiving signals representing data from a communications device within a coverage region of a cell or one of the spot beams, the spot beam forming a cell, the method comprising
receiving system information broadcasted by the infrastructure equipment, the system information including information relating to at least one of a cell or a spot beam of a neighbouring infrastructure equipment and a second spot beam of the infrastructure equipment,
wherein the system information is broadcast in accordance with at least one predetermined condition.

Paragraph 21. A communications device configured to operate in a wireless communications network, the wireless communications network comprising an infrastructure equipment, the infrastructure equipment being a non-terrestrial network part of the wireless communications network configured to transmit one or more spot beams to provide a wireless access interface for transmitting signals to and receiving signals representing data from a communications device within a coverage region of a cell or one of the spot beams, the spot beam forming a cell, the communications device comprising transceiver circuitry and controller circuitry configured in combination to receive system information broadcasted by the infrastructure equipment, the system information including information relating to at least one of a cell or a spot beam of a neighbouring infrastructure equipment and a second spot beam of the infrastructure equipment, wherein the system information is broadcast in accordance with at least one predetermined condition.

Paragraph 22. Circuitry for a communications device configured to operate in a wireless communications network, the wireless communications network comprising an infrastructure equipment, the infrastructure equipment being a non-terrestrial network part of the wireless communications network configured to transmit one or more spot beams to provide a wireless access interface for transmitting signals to and receiving signals representing data from a communications device within a coverage region of a cell or one of the spot beams, the spot beam forming a cell, the communications device comprising transceiver circuitry and controller circuitry configured in combination to receive system information broadcasted by the infrastructure equipment, the system information including information relating to at least one of a cell or a spot beam of a neighbouring infrastructure equipment and a second spot beam of the infrastructure equipment, wherein the system information is broadcast in accordance with at least one predetermined condition.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] TR 38.811, "Study on New Radio (NR) to support non terrestrial networks (Release 15)", 3rd Generation Partnership Project, December 2017.
[2] Holma H. and Toskala A, "LTE for UMTS OFDMA and SC-FDMA based radio access", John Wiley and Sons, 2009.
[3] RP-172834, "Revised WID on New Radio Access Technology," NTT DOCOMO, RAN #78.
[4] TR 38.913, "Study on Scenarios and Requirements for Next Generation Access Technologies (Release 14)", 3rd Generation Partnership Project.
[5] TS 36.311, "Evolved Universal Terrestrial Radio Access (E-UTRA); Radio Resource Control (RRC); Protocol specification", 3rd Generation Partnership Project.

What is claimed is:

1. A method for operating a communications device in a wireless communications network, the wireless communications network comprising an infrastructure equipment, the infrastructure equipment being a non-terrestrial network part of the wireless communications network configured to transmit one or more spot beams to provide a wireless access interface for transmitting signals to and receiving signals representing data from a communications device within a coverage region of a cell or one of the spot beams, the spot beam forming a cell, the method comprising:

receiving system information broadcasted by the infrastructure equipment, the system information including information relating to at least one of a cell or a spot beam of a neighboring infrastructure equipment and a second spot beam of the infrastructure equipment, wherein the system information is broadcast in accordance with at least one predetermined condition, wherein the at least one predetermined condition comprises the broadcasted system information being transmitted in combination with one or more validity timers, each of the one or more validity timers being associated with a portion of the system information and indicating a time duration for which the associated portion of the system information is valid, wherein each portion of the system information has its own validity timer, in response to one of the portions of system information changing, resetting the validity timer associated with that portion of system information, and wherein the communications device is acting as a relay node for one or more user equipment, each of the one or more user equipment being in one of an RRC connected mode, an RRC idle state or an RRC inactive state.

2. The method according to claim 1, wherein the at least one predetermined condition comprises the broadcasted system information including system information which relates to at least one of accessing of the cell or the spot beam of the neighboring infrastructure equipment by the communications device and non-terrestrial network aspects of the neighboring infrastructure equipment.

3. The method according to claim 2, wherein the non-terrestrial network aspects of the neighboring infrastructure equipment include ephemeris information of the neighboring infrastructure equipment.

4. The method according to claim 1, wherein the at least one predetermined condition comprises the broadcasted system information being transmitted in combination with an identifier of a system information area in which the system information is applicable.

5. The method according to claim 4, wherein the identifier of the system information area in which the system information is applicable indicates to the communications device whether or not the communications device should ignore the system information.

6. The method according to claim 4, wherein, in response to the cell or the spot beam of the infrastructure equipment and the cell or the spot beam of the neighboring infrastructure equipment being associated with different system information areas, the system information and the identifier of the system information area in which the system information is applicable are transmitted to the communications device as part of a handover command instructing the communications device to change between the coverage region of the cell or the spot beam of the infrastructure equipment and a coverage region of the cell or the spot beam of the neighboring infrastructure equipment.

7. The method according to claim 1, wherein in response to the validity timer indicating that a portion of system information is valid, it indicates that the communications device should not attempt to re-acquire that portion of system information.

8. The method according to claim 1, wherein the at least one predetermined condition comprises the broadcasted system information being periodically broadcast and being system information relating to at least one of accessing of the cell or the spot beam of the neighboring infrastructure equipment by the communications device and acquiring other system information, wherein the other system information is either broadcast or transmitted to the communications device on-demand.

9. The method according to claim 1, wherein the coverage region of the cell varies over time in accordance with a motion of the non-terrestrial network part with respect to the surface of the Earth.

10. The method according to claim 1, wherein a trajectory of the non-terrestrial network part is such that the coverage region of the cell or the spot beam is substantially constant over a time period.

11. The method according to claim 1, wherein the non-terrestrial network part comprises a satellite, an airborne vehicle or an airborne platform.

12. The method according to claim 1, wherein the communications device is a user equipment.

13. Circuitry for a communications device configured to operate in a wireless communications network, the wireless communications network comprising an infrastructure equipment, the infrastructure equipment being a non-terrestrial network part of the wireless communications network configured to transmit one or more spot beams to provide a wireless access interface for transmitting signals to and receiving signals representing data from a communications device within a coverage region of a cell or one of the spot beams, the spot beam forming a cell, the communications device comprising transceiver circuitry and controller circuitry configured in combination to:

receive system information broadcasted by the infrastructure equipment, the system information including information relating to at least one of a cell or a spot beam of a neighboring infrastructure equipment and a second spot beam of the infrastructure equipment, wherein the system information is broadcast in accordance with at least one predetermined condition, wherein the at least one predetermined condition comprises the broadcasted system information being transmitted in combination with one or more validity timers, each of the one or more validity timers being associated with a portion of the system information and indicating a time duration for which the associated portion of the system information is valid, wherein each portion of the system information has its own validity timer, in response to one of the portions of system information changing, reset the validity timer associated with that portion of system information, and wherein the communications device is acting as a relay node for one or more user equipment, each of the one or more user equipment being in one of an RRC connected mode, an RRC idle state or an RRC inactive state.

14. The circuitry for the communications device of claim 13, wherein the at least one predetermined condition comprises the broadcasted system information including system information which relates to at least one of accessing of the cell or the spot beam of the neighboring infrastructure equipment by the communications device and non-terrestrial network aspects of the neighboring infrastructure equipment.

15. The circuitry for the communications device of claim 14, wherein the non-terrestrial network aspects of the neighboring infrastructure equipment include ephemeris information of the neighboring infrastructure equipment.

16. The circuitry for the communications device of claim 13, wherein in response to the validity timer indicating that a portion of system information is valid, the communications device should not attempt to re-acquire that portion of system information.

* * * * *